United States Patent
Capodieci (10) Patent No.: US 9,167,845 B2
(45) Date of Patent: Oct. 27, 2015

(54) APPARATUS, METHOD AND PRODUCT FOR ULTRASONIC EXTRUSION OF A FLOWABLE SUBSTRATE

(75) Inventor: Roberto Capodieci, Glen Ellyn, IL (US)

(73) Assignee: Creative Resonance, Inc., Scottsdale, AZ (US)

( * ) Notice: Subject to any disclaimer, the term of this patent is extended or adjusted under 35 U.S.C. 154(b) by 360 days.

(21) Appl. No.: 11/786,676

(22) Filed: Apr. 12, 2007

(65) Prior Publication Data

US 2007/0172559 A1    Jul. 26, 2007

Related U.S. Application Data

(60) Provisional application No. 60/843,141, filed on Sep. 8, 2006.

(51) Int. Cl.
| | | |
|---|---|---|
| A22C 7/00 | (2006.01) | |
| A23P 1/00 | (2006.01) | |
| A47J 43/18 | (2006.01) | |
| A23C 3/07 | (2006.01) | |
| A23L 3/00 | (2006.01) | |
| A23L 3/30 | (2006.01) | |
| A21C 11/16 | (2006.01) | |
| A21D 13/00 | (2006.01) | |
| A23L 1/00 | (2006.01) | |
| A23L 1/025 | (2006.01) | |
| A23L 1/212 | (2006.01) | |
| A23L 1/317 | (2006.01) | |
| A47J 37/06 | (2006.01) | |
| A23L 3/005 | (2006.01) | |

(52) U.S. Cl.
CPC . *A23L 3/30* (2013.01); *A21C 11/16* (2013.01); *A21D 13/0038* (2013.01); *A23L 1/0076* (2013.01); *A23L 1/0252* (2013.01); *A23L 1/212* (2013.01); *A23L 1/317* (2013.01); *A23L 3/005* (2013.01); *A47J 37/0694* (2013.01)

(58) Field of Classification Search
CPC ... A23L 3/005; A23L 1/0252; A47J 37/0694; A47J 37/0704; A22C 7/00; A23P 1/105; A23P 1/12
USPC ............ 99/451, 426, 441; 426/238, 513, 512, 426/516
See application file for complete search history.

(56) References Cited

U.S. PATENT DOCUMENTS

| | | | | |
|---|---|---|---|---|
| 6,010,592 | A * | 1/2000 | Jameson et al. ........... | 156/379.6 |
| 6,395,216 | B1 * | 5/2002 | Jameson ........................ | 264/476 |
| 6,517,879 | B2 * | 2/2003 | Capodieci ..................... | 426/238 |
| 6,655,948 | B2 * | 12/2003 | Capodieci .................. | 425/174.2 |
| 6,726,948 | B2 * | 4/2004 | Skene et al. ................. | 426/513 |
| 6,783,784 | B2 * | 8/2004 | Skene et al. ................. | 426/238 |
| 2003/0003207 | A1 * | 1/2003 | Capodieci ..................... | 426/421 |
| 2003/0041743 | A1 * | 3/2003 | Capodieci ........................ | 99/353 |
| 2003/0207001 | A1 * | 11/2003 | Skene et al. ................. | 426/238 |
| 2003/0207013 | A1 * | 11/2003 | Skene et al. ................. | 426/516 |
| 2004/0134327 | A1 * | 7/2004 | Capodieci ....................... | 83/932 |

* cited by examiner

Primary Examiner — Dana Ross
Assistant Examiner — Hemant Mathew
(74) Attorney, Agent, or Firm — Pauley Erickson & Kottis

(57) ABSTRACT

This invention relates generally to ultrasonic extrusion apparatus, methods and products. A flowable substrate may be supplied by an infeed to an extrusion chamber having an ultrasonic horn. The flowable substrate contacts the ultrasonic resonant horn and receives ultrasonic energy before and/or as passing through an extrusion orifice. Suitable flowable substrates may include meat emulsions, pomace solutions, and dough. The extruded product may have virtually any solid or hollow shape. The flowable substrate may form a shape-retaining product that may be cut without significantly deforming.

15 Claims, 7 Drawing Sheets

APPARATUS, METHOD AND PRODUCT FOR ULTRASONIC EXTRUSION OF A FLOWABLE SUBSTRATE

CROSS REFERENCE TO RELATED APPLICATION

This application claims the benefit of U.S. Provisional Application No. 60/843,141 filed on 8 Sep. 2006.

BACKGROUND OF THE INVENTION

1. Field of the Invention

This invention relates generally to ultrasonic extrusion apparatus, methods, and products. Specifically, this invention relates to a flowable substrate that is formed into a product with the addition of ultrasonic energy.

2. Discussion of Related Art

Many edible products are produced by conventional extrusion devices, such as, augers and screws to form solid or hollow products. However, these conventional devices may have slower line speeds than desired and may necessitate additional duplicate units to achieve needed throughput rates. The additional units increase capital expenditures for equipment and factory floor space. The additional units increase cleaning and sterilization requirements between product batches.

Often conventional extruded product does not hold its shape as well as may be desired, especially during subsequent processing, such as, slicing and baking. Often long ovens are employed to condition or dry a product rope to a sufficient level before a slicing machine. Similarly, conventional extruded products may not be as dense and/or as uniform as desired.

SUMMARY OF THE INVENTION

There exists a need for an improved apparatus for extrusion of a flowable substrate which results in an improved extruded product. This need may be met at least in part by an ultrasonic extrusion apparatus having increased throughput to produce a uniformly set product at the extrusion point, capable of holding the imparted shape throughout the subsequent process steps.

An apparatus for extruding a flowable substrate may include an infeed to supply the flowable substrate and a chamber having an extrusion orifice in communication with the infeed. An ultrasonic horn may extend into the chamber and across the extrusion orifice so that an extrusion path of the flowable substrate extends across the ultrasonic horn.

The apparatus for ultrasonic extrusion may further include a booster coupled to the ultrasonic horn, a converter coupled to the booster and a power supply connected to the converter. Preferably, the apparatus for ultrasonic extrusion may also include an adjustment mechanism for varying a position of the ultrasonic horn with respect to the chamber. The adjustment mechanism may mount to a nodal ring on the ultrasonic horn.

The extrusion chamber may generally be formed by a base and a top cover which may be removable. Preferably, the extrusion chamber may substantially conform to a shape of the extrusion orifice. The chamber and the ultrasonic horn may have substantially rounded surfaces to maximize flow of flowable substrate and minimize catch points which may be detrimental to certain ingredients, such as puffed cereal. The ultrasonic horn may be substantially congruent with the extrusion orifice and may extend into and/or through the extrusion orifice. The extrusion orifice may include a plurality of small apertures, such as, for example, to make a spaghetti-like product.

The extrusion orifice may include a tapered profile from the chamber toward the extrusion orifice. The extrusion orifice may include virtually any shape and/or size. The chamber may be substantially contoured to the ultrasonic resonant horn.

An additional configuration of the apparatus for ultrasonically extruding a flowable substrate may include a chamber with an infeed for supplying a flowable substrate to the chamber and having a plurality of extrusion orifices. A plurality of ultrasonic resonant drivers may correspond to the plurality of extrusion orifices. The ultrasonic resonant drivers may be energized by a mother horn coupled to the plurality of resonant drivers. The chamber may include more than one infeed and the chamber may be divided into separate chambers which may have individual or shared infeeds.

This invention further includes a method of extruding a flowable substrate which may include providing a flowable substrate to an infeed from a motive force and flowing the flowable substrate from the infeed into a chamber, where the chamber contains an ultrasonic horn. Then the method may include contacting the flowable substrate with the ultrasonic horn and energizing the ultrasonic horn with ultrasonic energy. Other steps of the method may include transferring energy from the ultrasonic horn to the flowable substrate and extruding the flowable substrate through an extrusion orifice to form a product.

Preferably, the method may include at least one of the steps of gelling pectin, agglomerating particles, setting proteins or other suitable steps to form a shape-retaining product. The ultrasonic energy may have a frequency of about of about 15 KHz to about 40 KHz. The method may further include immediately slicing the product into shape-retaining pieces following the extruding step.

The extruded flowable substrate may produce a product having a solid cross section or a hollow cross section in virtually any shape, such as, for example, round, oval, square, rectangle, triangle, star, crescent, and irregular shapes.

An extruded product of this invention, may include a flowable substrate formed into a shape by ultrasonic extrusion and a member of the group consisting of a coloring agent, a moistening agent, a flavoring agent, a sweetening agent, and combinations thereof. The ultrasonically extruded product may contain a flowable substrate which includes an ultrasonically settable protein, ultrasonically gellable pectin, or pomace which may include at least one of fruit material and/or vegetable material to form a shape-retaining product. Desirably, the flowable substrate may include apple-based material.

Other objects and advantages will be apparent to those skilled in the art from the following detailed description taken in conjunction with the appended claims and the drawings.

BRIEF DESCRIPTION OF THE DRAWINGS

The above and other objects of this invention can be better understood when the specification is read in view of the drawings, wherein.

DETAILED DESCRIPTION OF THE INVENTION

Ultrasonic extrusion may provide an effective manner to supply or inject energy into flowable substrate 78 or material. Ultrasonic components may impart a significant amount of energy or power rapidly to flowable substrate 78 in a targeted, a measured and a precise manner or method to generate or create significant changes in flowable substrate 78 and the extrusion process. Typically, three variables may readily affect such ultrasonic energy injection. The first is the time or contact of flowable substrate 78 with an ultrasonic energy source. The second is the amplitude of the ultrasonic energy and the third are the contact forces or coupling between flowable substrate 78 and the ultrasonic energy source. Other variables, such as, for example, rheological properties of flowable substrate 78, shape of the ultrasonic energy source and volume of extrusion cavity 50, may also affect the resulting extruded material.

Typical benefits of ultrasonic extrusion may include densified, set product 76, uniform product 76, firmer-held-together product 76, and/or lightly agglomerated product 76 when using certain flowable substrates 78 at proper processing conditions.

Ultrasonic extrusion may produce unexpected results which may include shape-retaining product 76, that is product 76 that retains a desired shape following extrusion, and significant extruder throughput increases. Surprisingly, increases of 3, 5, 7 and 10 times nonultrasonically energized extruder throughput may be realized by the addition of ultrasonic energy. Without being bound by theory, ultrasonic energy may push flowable substrate 78 through extrusion orifice 58 with significantly less friction and thus reduce the back pressure on the extruder screw which allows additional flow or volume of flowable substrate 78.

Apparatus

Figure 1:
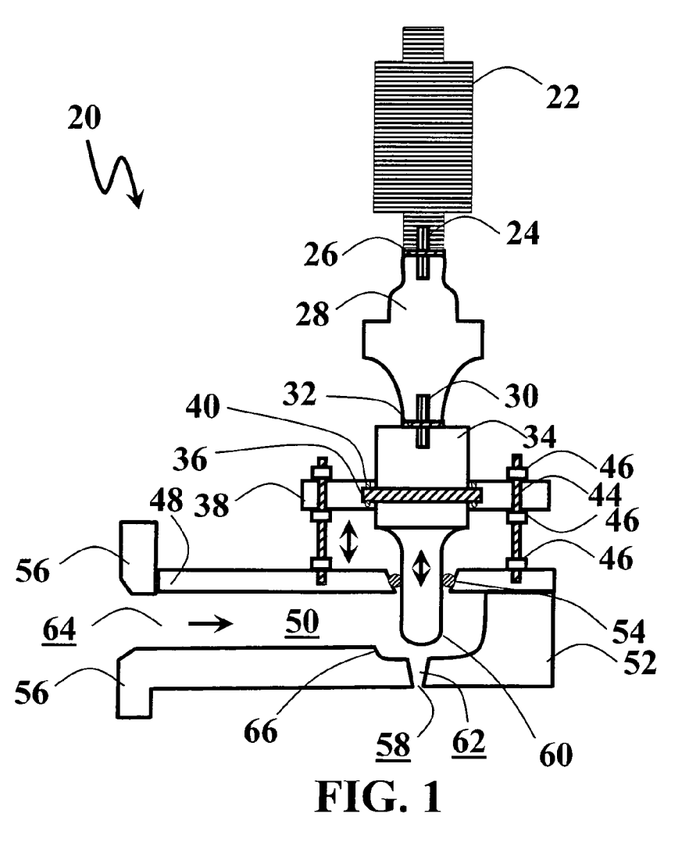
FIG. 1 is a sectional view of an apparatus for ultrasonic extrusion, according to one preferred embodiment of this invention.

FIG. 1 shows a sectional view of apparatus 20 for ultrasonic extrusion of flowable substrate 78 to produce product 76. Desirably, apparatus 20 mounts on or joins to an infeed device, not shown. Suitable infeed devices may include, without limitation, extruders, augers, fluted rollers, conveyors, progressive cavity pumps, positive displacement pumps and any other suitable delivery vehicle for supply or dispensing of flowable substrate 78 with a motive force. Desirably, infeed, not shown, provides flowable substrate 78 in at least a substantially continuous manner. According to a preferred embodiment of this invention, the infeed device is a constant pitch single screw extruder.

Flowable substrate 78 may broadly include, without limitation, dough, batters, chocolate refinings, meat emulsions, creams, sauces and any other suitable extrudable material. Desirably, flowable substrate 78 becomes at least a part of a food product. Flowable substrate 78 may include a substantially homogeneous material, such as, for example, short bread cookie dough or pretzel dough. Inclusions 80 or mixins such as nuts, candies, jellied fruits, dehydrated vegetables, protein cubes and any other suitable nonhomogeneous item may be included in flowable substrate 78. Flowable substrate 78 may further include cosmetics and other personal hygiene products generally having a substantially solid end-use form, such as, for example, lipsticks and soaps. According to a preferred embodiment of this invention, flowable substrate 78 is a meat emulsion used to produce pet food.

Typically, apparatus 20 may include an ultrasonic transducer system. An ultrasonic transducer system may include components such as, for example: a power supply, not shown; radio frequency cable, not shown; amphenol connector, not shown; converter 22; converter coupling 24; booster 28; booster coupling 30; and ultrasonic horn 34.

Typically, converter 22 receives an electrical input signal from the power supply or source to produce, transform, or make ultrasonic mechanical vibrations or energy. Converter 22 may be any size needed to supply adequate ultrasonic energy to flowable substrate 78. Adequate ultrasonic energy may depend upon many variables, such as, for example, the volumetric flowrate of flowable substrate 78, the rheological properties of flowable substrate 78, a thickness and/or viscosity of flowable substrate 78, and a dimension and/or shape of an extruded item. According to a preferred embodiment of this invention, converter 22 has a frequency of about 15 KHz to about 40 KHz.

An ultrasonic transducer system may optionally include one or more boosters 28. Booster 28 generally serves to increase or decrease amplitude or peak to peak height of the ultrasonic wave. Booster 28 may include a booster nodal ring, not shown, which does not vibrate with the frequency of converter 22. Booster nodal rings or inert rings and points may be used for mounting, supporting or fixing a location of booster 28. Boosters 28 generally may change amplitude by a factor of about 0.5 to about 3 times the amplitude produced by converter 22.

Desirably, converter coupling 24 ultrasonically connects to or provides ultrasonic communication between converter 22 and booster 28. Converter coupling 24 may include, without limitation, relatively permanent unions, such as, for example, brazing or electron beam welding, and interchangeable or replaceable unions, such as, for example, mechanical flanges, clamps, and threaded connectors. According to a preferred embodiment of this invention, converter coupling includes a properly torqued threaded stud inserted into corresponding threaded bores on converter 22 and booster 28.

Converter anti-fretting device 26 may be included between mating surfaces of converter 22 and booster 28. Fretting may occur as the ultrasonic energy causes friction between mating surfaces. This friction may rapidly generate significant heat and detune the system resulting in power supply overload and/or ultrasonic component failure. This action may create bumps or ripples on the mating surfaces which may produce galling or welding of the mating surfaces. Anti-fretting device 26 may include silicone grease, polymer washers, and any other suitable material to transmit ultrasonic energy and prevent fretting. According to a preferred embodiment of this invention, a Mylar® washer is placed or sandwiched between converter 22 and booster 28, as well as between booster 28 and horn 34.

The ultrasonic stack may further include ultrasonic horn 34 or sonotrode. Ultrasonic horn 34 may be the primary device for delivery of ultrasonic energy into flowable substrate 78. Desirably, ultrasonic horn 34 may be compatible with flowable substrate 78, such as chemically resistant or inert and desirably not changing a taste and/or a color of flowable substrate 78. Materials of construction for ultrasonic horn 34 may include aluminum, titanium, steel and any other suitable ultrasonic transmitting material. Ultrasonic horn 34 may have treated exterior surfaces, such as, for example, hard coat anodizing for aluminum, carbide coating for titanium and steel for abrasion resistance, and any other suitable treatment to produce desired results.

Ultrasonic horn 34 may be sanitized and/or sterilized for use with edible items. According to a preferred embodiment of this invention, apparatus 20 and ultrasonic horn 34 has an inherent clean in place capability such that between product batches a cleaning solution, such as, for example, water and iodine, can be introduced desirably while the ultrasonic energy source is active to allow cavitation to assist in cleaning.

Ultrasonic horn 34 may include horn nodal ring 36 which may have the characteristics and qualities described above for a booster nodal ring, not shown. Ultrasonic horn 34 may generally be of any suitable size and shape for imparting ultrasonic energy into flowable substrate 78. According to a preferred embodiment of this invention, ultrasonic horn 34 has substantially rounded surfaces.

Ultrasonic transducer system may further include booster coupling 30 and booster anti-fretting device 32 which may have characteristics and qualities described above with respect to converter coupling 24 and converter anti-fretting device 26, respectively.

Desirably, the ultrasonic transducer system includes an adjustment mechanism for varying at least one of: the insertion of the ultrasonic horn 34 into extrusion chamber 50, the volume of extrusion chamber 50, the residence time of flowable substrate 78 within in ultrasonic chamber 50, the back pressure on extrusion orifice 58, the passageway or clearance for inclusions 80, the contact force or coupling between flowable substrate 78 and ultrasonic horn 34, and combinations thereof.

As shown in FIG. 1 and according a preferred embodiment of this invention, the adjustment mechanism may include horn adjusting ring 38, at least one positioning screw 44 and at least one positioning nut 46. Desirably, horn adjusting ring 38 mounts to horn nodal ring 36. Horn adjusting ring 38 may include any supporting and calibrating mechanism to clamp or hold horn nodal ring 36. According to a preferred embodiment of this invention, horn adjusting ring 38 includes a split design to allow or facilitate installation and/or removal.

Horn adjusting ring 38 may further include at least one o-ring 40 to aid in clamping horn nodal ring 36. Suitable materials for o-ring 40 may include, for example, natural or synthetic rubbers and elastomers. According to a preferred embodiment of this invention, o-ring 40 is Buna rubber.

The adjustment mechanism with adjusting screws 44 may insert or remove ultrasonic horn 34 from extrusion chamber 50. Typically, positioning screws 44 include a threaded rod or stud of sufficient length to facilitate operation and/or maintenance of apparatus 20. According to a preferred embodiment of this invention, three positioning screws 44 substantially support horn adjusting ring 38 at substantially equally spaced locations.

Positioning screws 44 may include positioning nuts 46 to locate or dial-in a location or position of ultrasonic transducer system with respect to a position within extrusion chamber 50. Typically, positioning nuts 46 may include helically threaded nuts or collars with a diameter corresponding to positioning screws 44. Positioning nuts 46 may include items being manually or tool adjusted and may include locking or vibration-resistant mechanisms.

Those skilled in the art and guided by the teachings herein will readily appreciate that the adjustment mechanism may include any suitable design to engage and adjust ultrasonic horn 34 in extrusion chamber 50 and is not limited to configurations shown in the figures and described explicitly herein.

Extrusion chamber 50 may include a space or void generally formed by top plate 48 and base 52. Desirably, top plate 48 or removable cover may be removable to allow access to extrusion chamber 50 for fabrication and/or cleaning. Top plate 48 and ultrasonic horn 34 may include seal 54 in between. Seal 54 may be compatible with flowable substrate 78 and may prevent flowable substrate 78 from escaping or exiting from extrusion chamber 50 around or between ultrasonic horn 34 and a hole or opening in top plate 48. Desirably, seal 54 may apply minimal force perpendicular to a side of ultrasonic horn 34. Too much force may impede or dampen ultrasonic horn 34 and/or cause seal 54 failure due to heat build up, while too little may allow leakage. According to a preferred embodiment of this invention, seal 54 may include an anti-reflux o-ring made of Teflon® elastomers. Ultrasonic horn 34 desirably may include a substantially parallel surface and/or a substantially equal diameter to facilitate adjustment mechanism and seal 54 cooperation.

Base 52 may further include infeed coupling 56 for attaching or mating with infeed device, not shown. Base 52 may include additional heating or cooling systems depending on the thermal processing requirements for flowable substrate 78. Typically, infeed coupling 56 may include mechanical couplings and/or joints. According to a preferred embodiment of this invention, infeed coupling 56 includes a flange.

Infeed coupling 56 may form part of infeed channel 64 or path for flowable substrate 78. Desirably, infeed channel 64 maintains a substantially similar diameter to infeed device.

Infeed channel 64 may connect with or extend into extrusion chamber 50. Extrusion chamber 50 may have chamber surface 66. Generally, chamber surface 66 may be contoured, rounded, and/or smoothed to avoid or minimize sharp edges or transitions where flowable substrate 78 may accumulate or collect. Generally, extrusion chamber 50 may substantially conform to a shape of extrusion orifice 58. Conform may generally include being similar and/or identical with substantial shape compliance. It may be desirable that flowable substrate 78 properly follows the lateral surface of ultrasonic horn 34 as it proceeds to and through extrusion orifice 58. It may be further desirable that extrusion chamber 50 provides minimal resistance to the flowable substrate 78 flow thereby permitting a free flowing supply of flowable substrate 78 through extrusion chamber 50 and out of extrusion orifice 58.

Chamber surface 66 may include layers or treatments to improve surface characteristics, such as, for example, increased abrasion resistance by weld overlay and/or reduced sticking by application of a fluoropolymer.

According to a preferred embodiment of this invention, apparatus 20 for extruding flowable substrate 78 may include an infeed, not shown, an extrusion chamber 50 having extrusion orifice 58; and ultrasonic horn 34 extending into extrusion chamber 50 and across extrusion orifice 58 so that an extrusion path of flowable substrate 78 extends across ultrasonic horn 34. Across generally may include at least substantially aligned with or along. Typically, the extrusion path creates sufficient contact between flowable substrate 78 and ultrasonic horn 34 to impart or transfer a desired level of ultrasonic energy. Ultrasonic horn 34 may pass or extend therethrough extrusion chamber 50.

Extrusion chamber 50 may be profiled to increase a pressure on flowable substrate 78 approaching ultrasonic horn 34. According to a preferred embodiment of this invention, apparatus 20 for extruding flowable substrate 78 may include an interior profile of extrusion chamber 50 that is substantially contoured to and/or around ultrasonic horn 34.

Extrusion chamber 50 may include at least one extrusion channel 62. Extrusion channel 62 may be tapered or flared to focus flowable substrate 78 and/or ultrasonic energy during extrusion. Generally, extrusion orifice 58, hole or bore may, but not necessarily, be located at an end of extrusion channel 62. Extrusion channel 62 may connect extrusion orifice 58 by a profile from extrusion chamber 50.

Extrusion chamber 50 may be formed generally in-line with the infeed, not shown, and include extrusion orifice 58 formed generally at an angle relative to the infeed, not shown. Other suitable configurations of extrusion chamber 50 may be possible as desired that similarly permit passage of flowable substrate 78 from the infeed, not shown, and through extrusion orifice 58, such as, for example, in-line or obtuse angles. Generally, a centerline of ultrasonic horn 34 at least substantially may align with a center line of extrusion orifice 58.

As discussed in detail, below extrusion orifice 58 may have virtually any shape and/or size to accommodate desired end products 76. Generally, extrusion chamber 50 may contour or substantially conform to a shape of extrusion orifice 58. Desirably, the contour of extrusion chamber 50 provides a substantially equal residence or dwell time for flowable substrate 78 to impart or deliver a consistent amount or quantity of ultrasonic energy into flowable substrate 78 and produce a uniform and consistent product 76. Contour of extrusion chamber 50 may also be designed to include an inclusion 80 passageway. Generally, for product 76 having inclusions 80, inclusion 80 passageway, space or distance between two surfaces such as, for example, chamber surface 66 and ultrasonic horn 34 may be at least equal to an average particle diameter or size of inclusion 80.

Figure 2:
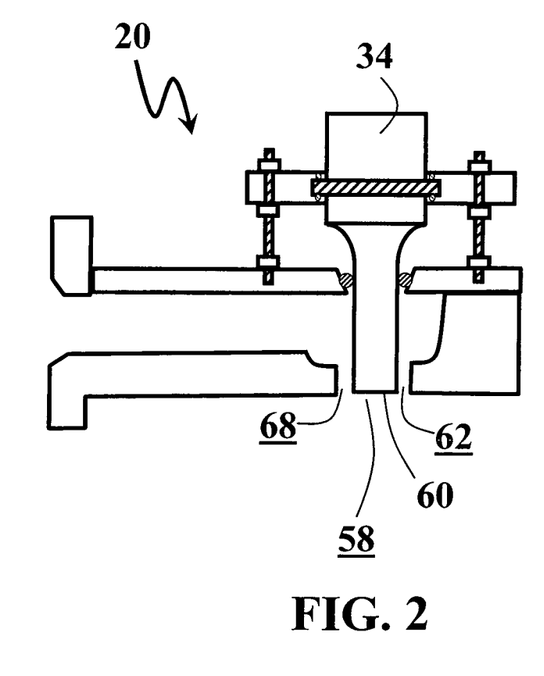
FIG. 2 is a sectional view of an apparatus for ultrasonic extrusion, according to one preferred embodiment of this invention.

Ultrasonic horn 34 may have horn face 60, end or tip located at a distal end of ultrasonic horn 34. Desirably, horn face 60 may be at least substantially congruent with extrusion orifice 58. Congruent may include items that are generally superposable so as to be coincident throughout, such as, for example, a star with a distance of 2 inches from tip to tip or point to point may be congruent with a circle having a diameter of 2 inches. Generally, horn face 60 may be any size, shape, and/or diameter depending on such variables as the size of product 76, opening of extrusion orifice 58, and properties of flowable substrate 78. Horn face 60 and ultrasonic horn 34 generally may be engineered using harmonic principles, theories, rules and formulas to provide efficient and reliable designs in the needed and desired shapes, profiles, sizes, lengths and/or diameters. Typical horn face 60 shapes may include rounded, curved, domed, flattened and flat. FIG. 1 shows a substantially domed horn face 60, while FIG. 2 shows a substantially flat horn face 60.

Figure 4A:
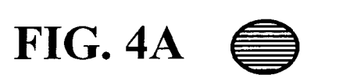
FIG. 4A is a sectional view of an orifice shape, according to one preferred embodiment of this invention.
Figure 4B:
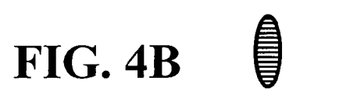
FIG. 4B is a sectional view of an orifice shape, according to one preferred embodiment of this invention.
Figure 4C:
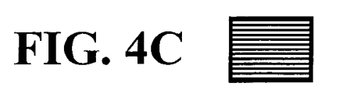
FIG. 4C is a sectional view of an orifice shape, according to one preferred embodiment of this invention.
Figure 4D:
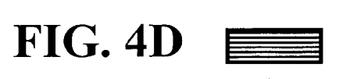
FIG. 4D is a sectional view of an orifice shape, according to one preferred embodiment of this invention.
Figure 4E:
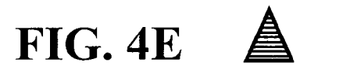
FIG. 4E is a sectional view of an orifice shape, according to one preferred embodiment of this invention.
Figure 4F:
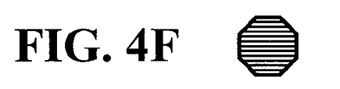
FIG. 4F is a sectional view of an orifice shape, according to one preferred embodiment of this invention.
Figure 4G:
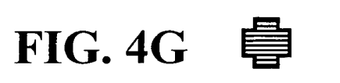
FIG. 4G is a sectional view of an orifice shape, according to one preferred embodiment of this invention.
Figure 4H:
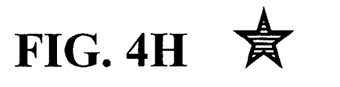
FIG. 4H is a sectional view of an orifice shape, according to one preferred embodiment of this invention.
Figure 4I:
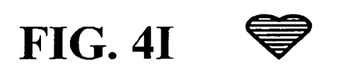
FIG. 4I is a sectional view of an orifice shape, according to one preferred embodiment of this invention.
Figure 4J:
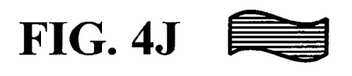
FIG. 4J is a sectional view of an orifice shape, according to one preferred embodiment of this invention.
Figure 4K:
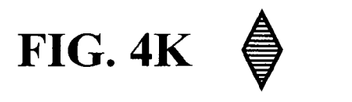
FIG. 4K is a sectional view of an orifice shape, according to one preferred embodiment of this invention.
Figure 4L:
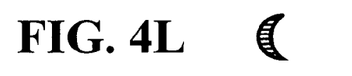
FIG. 4L is a sectional view of an orifice shape, according to one preferred embodiment of this invention.
Figure 4M:
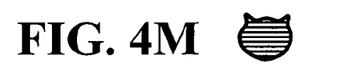
FIG. 4M is a sectional view of an orifice shape, according to one preferred embodiment of this invention.

Generally, product 76 shape may be formed or determined by a shape of extrusion orifice 58 or extrusion opening. Extrusion orifice 58 may have virtually any simple or complex shape. Some typical shapes are shown in FIGS. 4A-4P and may include broadly, without limitation: round, oval, elliptical, square, trapezoid, rectangle, ribbon, triangle, hexagon, octagon, decagon, cross, star, heart, spade, club, shamrock, pumpkin, banner, diamond, crescent, kitty, wreath, tree, annulus, pipe, round with square, triangle with square, and any other suitable combination of linear and/or arcuate shapes having regular or irregular outlines. Fanciful shapes may be used to produce novelty or seasonal products 76.

Particularly, as shown in FIGS. 4A-4M, extrusion orifice 58 may produce a solid or non-hollow product 76 when viewed in a cross section or generally transverse to extrusion orifice 58. Ultrasonic extrusion may form product 76 or a rope that is somewhat substantially rigid, which is capable of being further processed without significantly losing the extruded shape. Further processing may include, broadly, cutting, portioning, slicing, baking, cooking, dehydrating, steaming, frying, packaging and any other suitable step or action to prepare or produce a finished product 76.

Typically, solid product 76 may be formed when ultrasonic horn 34 ends close to or directly adjacent to extrusion orifice 58. Horn face 60 may extend toward extrusion orifice 58 according to one preferred embodiment of this invention so as to permit a solid rope of end product 76. In this embodiment, horn face 60 may be generally rounded so as to permit a smooth and unimpeded flow of flowable substrate 78 out of extrusion orifice 58 while maintaining close proximity of flowable substrate 78 with the sonically activated portions ultrasonic horn 34.

Figure 4N:
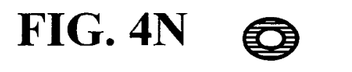
FIG. 4N is a sectional view of an orifice shape, according to one preferred embodiment of this invention.
Figure 4O:
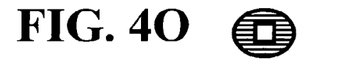
FIG. 4O is a sectional view of an orifice shape, according to one preferred embodiment of this invention.
Figure 4P:
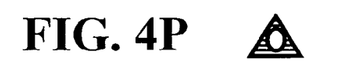
FIG. 4P is a sectional view of an orifice shape, according to one preferred embodiment of this invention.

Particularly, as shown in FIGS. 4N-4P, extrusion orifice 58 may produce a hollow rope or open product 76. Extrusion orifice 58 may have an inset form or mold to create a hollow product 76, such as, for example, as may be used to form rigatoni or other hollow pastas. Suitable inset forms may include a pin or a piercing mandrel. Positive pressure may be applied through the pin. According to a preferred embodiment of this invention and as shown in FIG. 2, hollow product 76 may be formed or shaped by ultrasonic horn 34 inserting or protruding at least part way into and/or through extrusion channel 62 and/or extrusion orifice 58 to form annulus 68 or a substantially concentric shape. Hollow product 76 may be filled or injected with an additional material or filling, such as, for example, creams, fruits, cheeses, meats and any other suitable flavor and/or texture item.

Horn face 60 may extend into extrusion orifice 58 preferably so as to form an inner diameter of end product 76. The walls of extrusion orifice 58 preferably may form the outer diameter of end product 76 which may be a generally tubular, hollow and generally continuous rope of product 76.

Coextrusion of a filling into product 76 may be done by application of ultrasonic energy to one or both the extruded materials, such as for example performing ultrasonic extrusion on both an external dough and an internal meat emulsion to result in a product having some rigidity or stiffness to both the shell and filling for downstream processing, such as, for example to make a pizza roll.

Figure 7:
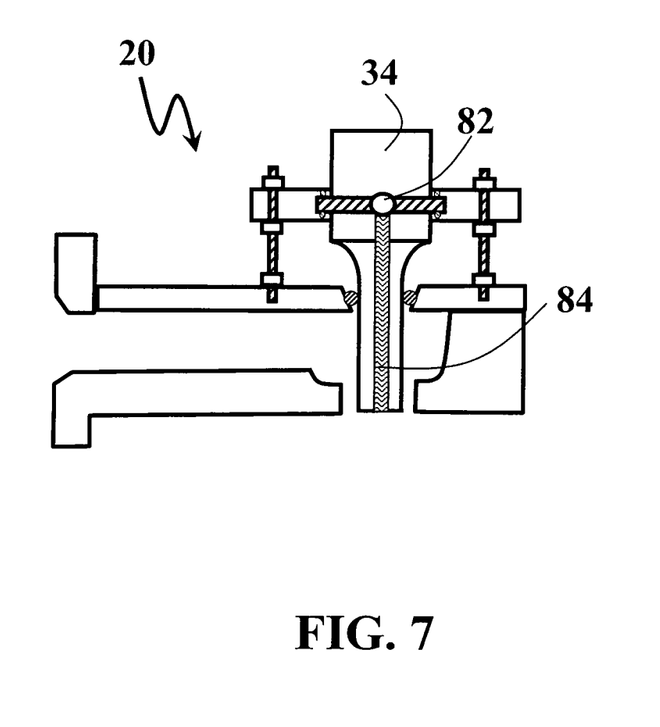
FIG. 7 is a sectional view of an apparatus for ultrasonic extrusion, according to one preferred embodiment of this invention.

As shown in FIG. 7 and according to a preferred embodiment of this invention, apparatus 20 may include ultrasonic horn 34 which has at least one coextrusion port 82 leading or connected to coextrusion passage 84. Desirably, coextrusion port 82 is located on a nodal ring 36 to facilitate reliable connection. Desirably, coextrusion passageway 84 provides ultrasonic energy to the internal material. Generally, coextruded product 78 may have generally two different materials but may include only one to allow ultrasonic energy injection to the core of product 78. Coextruded product 78 may generally have any substantially congruent shapes for the inside and outside materials when using two materials. Generally, coextrusion passage 84 may end at horn face 60 and optionally may include a separate orifice or restriction structure integral to ultrasonic horn 34.

Figure 3:
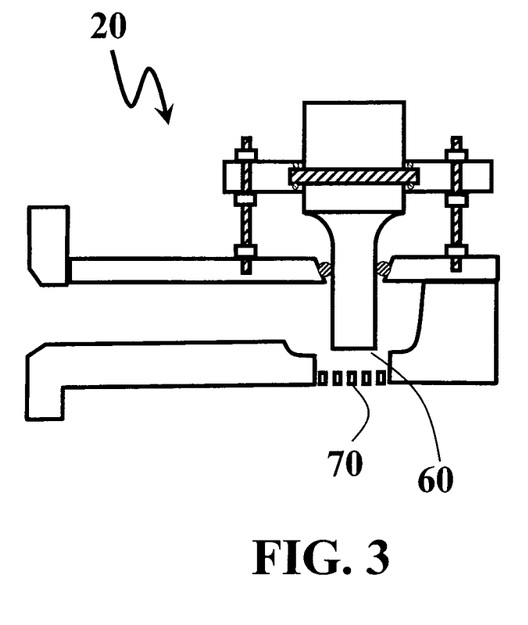
FIG. 3 is a sectional view of an apparatus for ultrasonic extrusion, according to one preferred embodiment of this invention.

According to a preferred embodiment of this invention and as shown in FIG. 3, apparatus 20 may include a die or die plate 70 having a plurality of (more than one of) or multiple apertures or relatively small bores and/or shapes. This configuration may be useful for producing product 76 having a finer or smaller diameter, such as, for example, angel hair pasta. Horn face 60 may extend generally across extrusion orifice 58 which includes an extrusion die. According to this preferred embodiment of this invention, horn face 60 may be generally planar so as to permit a smooth and unimpeded flow of flowable substrate 78 through die plate 70 while maintaining close proximity of flowable substrate 78 with sonically activated portions of ultrasonic horn 34.

Figure 5:
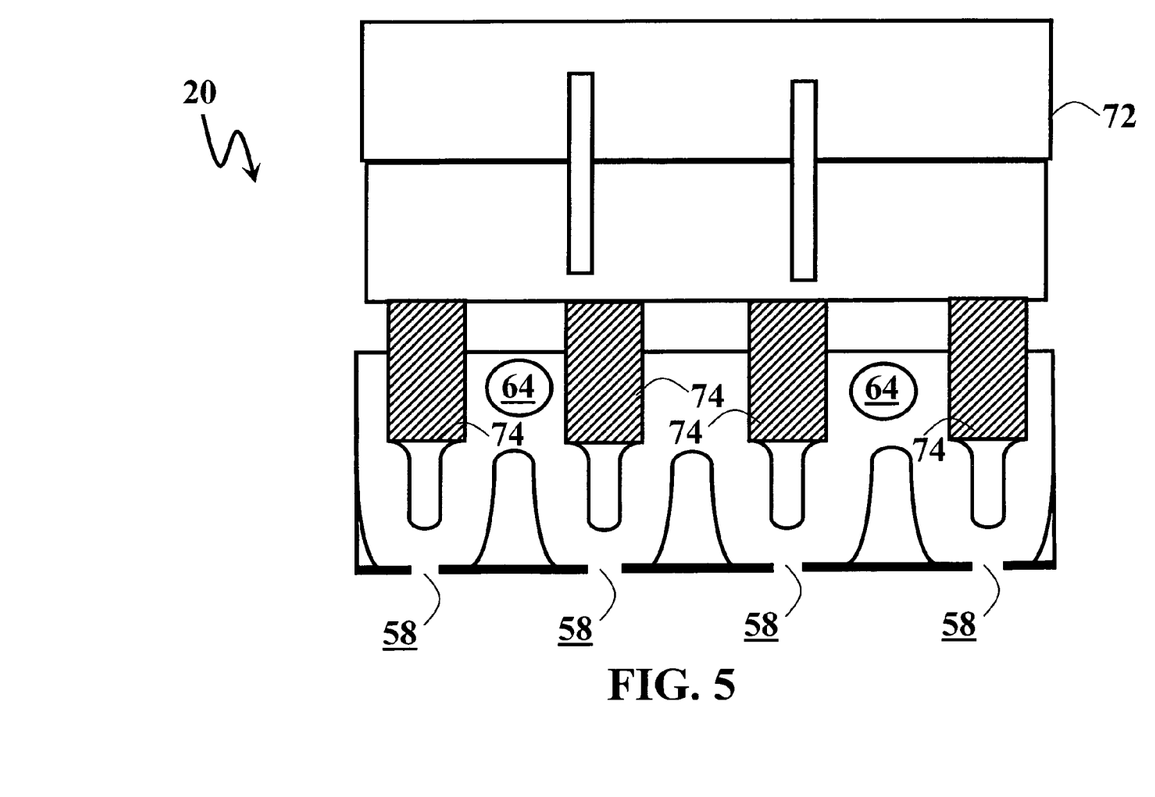
FIG. 5 is a sectional view of an apparatus for ultrasonic extrusion, according to one preferred embodiment of this invention.

As shown in FIG. 5 and according to a preferred embodiment of this invention, apparatus 20 for extruding flowable substrate 78 may include: a plurality of or several ultrasonic resonant drivers 74 corresponding to or associated with a plurality of or several extrusion orifices 58 in extrusion chamber 50; back driver or mother horn 72 coupled or in ultrasonic communication with the plurality of resonant drivers 74; and an infeed, not shown, for supplying flowable substrate 78 to the extrusion chamber 50. A composite horn typically may consist of a mother horn 72 and a plurality of resonant drivers 72. Desirably, resonant drivers 74 may be in a front position relative to the back driver and may vibrate substantially independent of each other and/or the back driver.

Generally, mother horn 72 and resonant drivers 72 may have a length equal to a one or more ½ wavelengths. The wavelength derives from the propagation of sound through a specific material (aluminum, titanium, etc.) at a specific frequency (15, 20 30, 40 KHz). For example, the backdriver 72 and the resonant driver 74 may be each equal to half a wavelength, for a total of one wavelength for the composite tool.

Desirably, infeed channel 64 may provide feed of flowable substrate 78 in a substantially uniform manner to ensure substantially equal ultrasonic energy injecting or contacting with all product 76 from all extrusion orifices 58. According to a preferred embodiment of this invention, infeed channel 64 may be located in a rear position. One infeed channel 64 may supply more than one extrusion orifice 58 and typically a substantially equal contact time will occur for each resonant driver 74.

Virtually any number of resonant drivers 74 may be included in apparatus 20 as limited by designs and configurations of mother horn 72. Generally, mother horn 72 may include rectangular or circular arrangements. Placing multiple ultrasonically extruded ropes in relatively close proximity sharing a common ultrasonic transducer system may significantly reduce installed capital costs, provide significant throughput or volume increases and afford product flexibility since different shapes could be made concurrently.

According to a preferred embodiment of this invention, combinations of apparatus 20 may be used to produce items having several different shapes or profiles, such as, for example, alphabet-shaped noodles for soup. Coproducing multiple shapes may significantly reduce inventorying or storage requirements and costs for intermediate materials which may also increase or improve product 76 freshness and/or consistency.

Figure 6A:
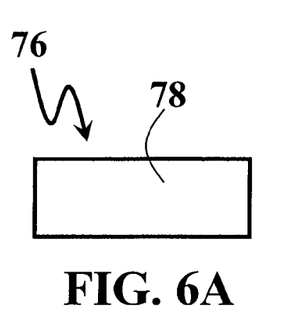
FIG. 6A is a sectional view of an ultrasonically extruded product, according to one preferred embodiment of this invention.
Figure 6B:
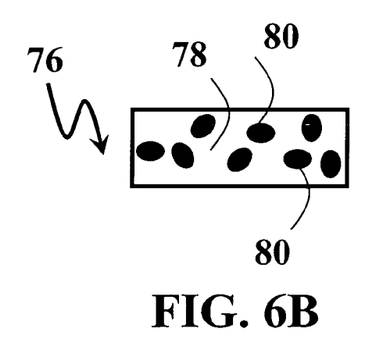
FIG. 6B is a sectional view of an ultrasonically extruded product, according to one preferred embodiment of this invention.

Apparatus 20 may include more than one infeed channel 64. Multiple infeed channels 64 may improve flowable substrate 78 distribution to extrusion orifice 58, as shown in FIG. 6. According to a preferred embodiment of this invention, apparatus 20 for extruding flowable substrate 78 may include each ultrasonic resonant driver 74 located in a separate or divided extrusion chamber 50 having a corresponding or an associated infeed, not shown. This configuration may allow coproduction of multiple different materials and/or shapes from the same apparatus 20, such as, for example, feeding red, white, and green pasta dough to each a separate infeed, not shown, to simultaneously produce tricolored pasta as may commonly be used in pasta salads.

According to a preferred embodiment of this invention, ultrasonic horn 34 may comprise a single horn inserted into extrusion chamber 50 however composite horns may alternatively be desirable. Composite horns generally may include a mother horn (or back driver) 72 carrying a plurality of resonant drivers 74. Composite horn may be utilized in extrusion chamber 50 using resonant drivers 74 of suitable sizes and shapes. Mother horn 72 may be rectangular or circular shape and include resonant drivers 74 of suitable shape to be compatible with that of extrusion orifice 58. Resonant drivers 54 may generally have characteristics discussed above with respect to ultrasonic horn 34. Preferably, one or more adjustment mechanisms may be included to position one or more resonant drivers 74 within extrusion chamber 50.

Method

This invention further may include a method for ultrasonically extruding flowable substrate 78. According to a preferred embodiment of this invention, the method of extruding flowable substrate 78 may include: providing flowable substrate 78 to an infeed, not shown, from a motive force; flowing flowable substrate 78 from the infeed, not shown, into extrusion chamber 50 with ultrasonic horn 34; contacting flowable substrate 78 with ultrasonic horn 34; energizing ultrasonic horn 34 with ultrasonic energy; transferring energy from ultrasonic horn 34 to flowable substrate 78; and extruding flowable substrate 78 through extrusion orifice 58 to form product 76. Generally, steps listed in these methods do not explicitly or implicitly connote or denote a preferred order or an amount. Contacting may generally involve physically touching two items together and preferably includes manners that provide sufficient transmission of ultrasonic energy between the items.

According to a preferred embodiment of this invention, the method of extruding flowable substrate 78 may further include ultrasonically gelling pectin from within flowable substrate 78. According to another preferred embodiment of this invention, the method of extruding flowable substrate 78 may further include ultrasonically agglomerating particles within flowable substrate 78. According to another preferred embodiment of this invention, the method of extruding flowable substrate 78 may further include ultrasonically setting protein within flowable substrate 78. According to another preferred embodiment of this invention, the method of extruding flowable substrate 78 may further include ultrasonically neutralizing enzymes within flowable substrate 78, such as, for example, in wheat germ particles. Neutralized wheat germ particles may be particularly useful for baking applications.

Desirably, but not necessarily, flowable substrate 78 forms a solid formed product 76 but may depending on flowable substrate 78 and desired uses may also form a loosely formed or agglomerated material that can readily be broken apart, such as, for example, by moving on a vibratory conveyor. Alternately, flowable substrate 78 may remain as substantially discrete or individual particles following ultrasonic extrusion.

Desirably, but not necessarily, ultrasonic energy used in the methods of this invention may have a frequency of about of about 15 KHz to about 40 KHz.

According to a preferred embodiment of this invention, the method of extruding flowable substrate 78 may further include immediately slicing product 76 into shape-retaining pieces following extruding. Immediately may generally be within a few seconds to brief moments after product 76 exits extrusion orifice 58.

In operation, flowable substrate 78 may be provided into extrusion chamber 50 and across and/or around ultrasonic horn 34. Energy may be applied to ultrasonic horn 34, either continuously or intermittently and at constant or modulated amplitude, and flowable substrate 78 may then be extruded through extrusion orifice 58. As a result, flowable substrate 78 may be conditioned in a desired manner and may be shaped or formed into a desirable configuration or shape. Variations in the processing conditions may create additional textural complexities or characteristics for product 76.

Product

According to a preferred embodiment of this invention and shown in FIG. 6A, product 76 may include flowable substrate 78 to form a substantially continuous rope having a bar or bar-like shape. According to a preferred embodiment of this invention and as shown in FIG. 6B, product 76 may include flowable substrate 78 and inclusion 80 of at least one different material from flowable substrate 78.

According to a preferred embodiment of this invention, extruded product 76 may include: flowable substrate 78 formed into a shape by ultrasonic extrusion; and a member of the group consisting of a coloring agent, a moistening agent, a flavoring agent, a sweetening agent, and combinations thereof.

Coloring agents typically may include food colorings in liquid or solution form, solid pigments, such as titanium dioxide and any other suitable color imparting or enhancing material. Moistening agents may include water, milk, alcohol, honey, emulsions and any other suitable wetting or dampening material. Flavoring agents may include broadly spices, salts, peppers, aromatics, synthetic flavors, natural extracts and any other suitable taste imparting compound. Sweetening agents may include simple and complex sugars, corn syrup, refined and unrefined cane or beet products, artificial sweeteners and any other suitable material to modify or stimulate receptors on a sweet sensing area of the tongue.

According to a preferred embodiment of this invention, ultrasonically extruded product 76 may include flowable substrate 78 which has ultrasonically settable or fixable proteins to form a shape-retaining product 76. According to a preferred embodiment of this invention, ultrasonically extruded product 76 may include flowable substrate 78 which includes ultrasonically gellable or gelatinizable pectin to form a shape-retaining product 76.

Desirable flowable substrates 78 may include pomace derived or made from fruit and/or vegetable material. According to a preferred embodiment of this invention, ultrasonically extruded product 76 may include flowable substrate 78 which includes apple-based material. Possible sources of pomace may include apples, pears, peaches, grapes, grape seeds, olives, carrots, tomatoes, beans, soy beans, potatoes, corn, wheat, peppers, and any other suitable material formable by ultrasonic energy.

Without being bound by theory, ultrasonic extrusion generally may form shape-retaining product 76 from flowable substrate 78. Shape-retaining, generally may include that product 76 holds or maintains a shape or form upon exit from extrusion orifice 58. Desirably, shape-retaining may include retaining shape during additional processing steps, such as, for example, cutting, portioning, conveying, baking, etc. Nonshape-retaining may include items that permanently deform when subjected to process action such as cutting, or simply collapse as they are deposited on any kind of conveying devices such as belts, wire belts, trays, and the like. Typically, high water content dough may exhibit nonshape-retaining characteristics when processed using conventional extrusion processes.

Without being bound by theory, for some flowable substrates 78, ultrasonic energy may set or lock a shape of product 76 by altering a protein structure, such as, for example, coiling or folding at a molecular level of a meat emulsion.

Other flowable substrates 78 may have complex carbohydrates, starches, sugars and/or other polysaccharides that may be altered by ultrasonic energy. Some flowable substrates 78 may desirably include pectin which upon application of ultrasonic energy may be released from breaking down or collapsing cellular walls or structures. The pectin may then gel or coalesce to impart shape-retaining characteristics which may include a jellied like effect.

Ultrasonic energy may bind particles together to form or fuse an aggregate, such as, for example using puffed cereals. Application of a minor or modest amount of moisture may further assist or facilitate agglomeration ultrasonic processes. Desirably, additional liquids such as syrups including, for example, fruit syrups or corn syrups may provide flavor and/or sweetness to product 76 while aiding the shape-retaining ultrasonic extrusion process by imparting moisture.

According to a preferred embodiment of this invention, flowable substrate 78 may include fruit and/or vegetable pomace. Pomace typically may include a byproduct or residue of another processing step, such as, for example squeezing juice from grapes, carrots or apples. Pomace-based product 76 and materials may provide heathy alternatives to conventional candy bars and other junk food products as typically dispensed or sold from vending machines.

Flowable substrate 78 according to a preferred embodiment of this invention may comprise an edible substrate, such as, for example, shortbread dough, cracker dough, pretzel dough, cookie dough, bread dough, grissini or bread sticks, and the like. The edible substrate may additionally or alternatively comprise chocolate refinings, spreads, creams, amids, starches, carbohydrates, soy flour, sugars, meat emulsions, sauces such as ketchup, BBQ (barbeque) sauces, ketchup and the like.

Desirably ultrasonic extrusion may include an accompanying processing action. Such processing actions may include coagulation of proteins such as during the extrusion of meat emulsions. Pasteurization may comprise an additional or alternative processing action, such as during the extrusion of dairy products. Other processing actions may include drying, cooking, removing moisture, setting, conditioning, tempering, hardening, emulsification, homogenization, dispersion, melting, liquefaction, plasticizing and other suitable processing actions that may be accomplished using a suitable ultrasonic set-up.

For example, without limitation, pretzel dough may be provided into a configuration as shown in FIG. 2. Horn face 60 may be configured in a generally circular geometry and the sidewall of extrusion orifice 58 may be formed around ultrasonic horn 34. As a result a desired geometry may include about 12 mm OD and an about 8 mm ID forming a tubular pretzel shape about 22 mm long. Before the pretzel dough is passed through extrusion chamber 50, it may include a moisture content of 45% and after passage through extrusion chamber 50 a controlled amount of moisture may be removed from the pretzel dough but leaving enough moisture for adequate puffing or raising during subsequent baking or other processes. Too little moisture in a dough may lead to a finished material with less than desired texture or other characteristics. The ultrasonic extrusion may interact with proteins and/or other molecules to properly maintain a set, tubular shape which may be cut as early as at the extruder face without distortion and maintain its shape without collapsing. Such a manufacturing method may subsequently, after baking, permit the pretzel products to be filled with a desirable filling, such as, for example, cheese, sauce, jelly, chocolate, peanut butter and any other suitable flavored material. Ultrasonic extrusion may substantially eliminate or reduce the need for long and expensive conventional radio frequency or dielectric ovens in subsequent processing steps.

According to another desired application of this invention, flowable substrate 78 may include chocolate refinings. As the chocolate refinings may pass through extrusion chamber 50 and across ultrasonic horn 34, the dry chocolate flakes may be rapidly plasticized and emerge as a generally continuous plastic rope of chocolate that may then be utilized in post-processing, such as, for example, melting, molding, portioning, conching and novel conching.

Chocolate and other temperature sensitive materials may be particularly suited to ultrasonic extrusion since it imparts a significant amount of energy through vibration, directly to the product molecules, in a very short time, whose order of magnitude is seconds (or fractions thereof), rather than minutes (or multiples thereof). This rapid energy application may minimize product burning and other degradation caused by extended heat transfer.

According to another desired application of this invention, flowable substrate 78 may comprise meat emulsions which are passed through the extruder auger and into extrusion chamber 50. As energy is applied to ultrasonic horn 34 in extrusion chamber 50, the meat emulsions may pass out of extrusion orifice 58 in a coagulated form and a generally unitized flexible rope of meat product, such as sausage or sausage-like. Suitable meat items may broadly include beef, chicken, turkey, pork, buffalo, fish, any other suitable relatively high protein-containing material and combinations thereof.

According to another desired application of this invention, flowable substrate 78 may be wheat germ which is passed through the extruder auger and in extrusion chamber 50. As energy is applied to ultrasonic horn 34 in extrusion chamber 50, the enzymes in the wheat germ particulate are preferably rapidly neutralized.

According to yet another desired application of this invention, wet pasta dough may be passed through the desired configuration of extrusion chamber 50 and as the pasta passes across ultrasonic horn 34 and through extruder die plate 70, the pasta is set and/or pasteurized resulting in a processed pasta product. Both dry pasta or low moisture and fresh or higher moisture pasta may benefit from ultrasonic extrusion. Dry pasta may have a reduced oven drying time and reduced product loss from cracking as occurs when drying a wet dough. Fresh pasta with typically about 33% to about 35% moisture desirably is pasturized to improve shelf life and prevent spoilage from mold and reduce or eliminate a drying step.

The processing and extrusion according to a preferred embodiment of this invention may be modified by controlling the feed pressure of flowable substrate 78, the feed speed or velocity of the flowable substrate 78, the amplitude of the ultrasonic vibrations, flowable substrate 78 temperature, size of extrusion orifice 58 and other factors.

This invention encompasses ultrasonic extrusion apparatus, methods, and products. Headers provided in this Detailed Description of the Invention are not intended to be limiting, such as, for example, product shapes described under the Apparatus heading should broadly be applied to the Method and the Product sections as well.

While in the foregoing specification this invention has been described in relation to certain embodiments thereof, and many details have been set forth for purpose of illustration, it will be apparent to those skilled in the art that the invention is susceptible to additional embodiments and that certain of the details described herein can be varied considerably without departing from the basic principles of the invention.

What is claimed is:

1. An apparatus for extruding a flowable substrate comprising:
   an infeed;
   an extrusion chamber including a top plate and a base forming a void for the flowable substrate to flow through, the top plate including an opening and the base having an extrusion orifice, the extrusion chamber further including an infeed channel in communication with the infeed, the infeed channel maintaining a similar diameter to the infeed;
   an ultrasonic horn including a horn face, only the horn face of the ultrasonic horn extending through the opening in the top plate into the void of the extrusion chamber so that an extrusion path of the flowable substrate extends through the void of the extrusion chamber, across the horn face, and out of the void through the extrusion orifice;
   a nodal ring connecting the ultrasonic horn and the extrusion chamber; and
   an o-ring positioned between the horn face and the extrusion chamber, the o-ring and the horn face sealing the opening of the top plate of the extrusion chamber.

2. The apparatus for extruding a flowable substrate of claim 1, further comprising:
a booster coupled to the ultrasonic horn;
a converter coupled to the booster; and
a power supply connected to the converter.

3. The apparatus for extruding a flowable substrate of claim 1, further comprising an adjustment mechanism for varying a position of the ultrasonic horn and horn face with respect to the extrusion chamber.

4. The apparatus for extruding a flowable substrate of claim 3, wherein the adjustment mechanism mounts to the ultrasonic horn at the nodal ring.

5. The apparatus for extruding a flowable substrate of claim 3, wherein the top plate the extrusion chamber includes a removable cover.

6. The apparatus for extruding a flowable substrate of claim 1, wherein the extruded flowable substrate produces a product having a solid cross section or a hollow cross section.

7. The apparatus for extruding a flowable substrate of claim 6, wherein the product has a cross section shape selected from the group consisting of round, oval, square, rectangle, triangle, star, crescent, and irregular shapes.

8. The apparatus for extruding a flowable substrate of claim 1, wherein the extrusion chamber substantially conforms to the shape of the extrusion orifice.

9. The apparatus for extruding a flowable substrate of claim 8, wherein the extrusion chamber and the horn face have substantially rounded surfaces.

10. The apparatus for extruding a flowable substrate of claim 9, wherein the horn face of the ultrasonic horn is substantially congruent with the extrusion orifice.

11. The apparatus for extruding a flowable substrate of claim 1, wherein extrusion orifice includes a die plate with a plurality of small apertures.

12. The apparatus for extruding a flowable substrate of claim 1, wherein extrusion orifice includes a tapered profile from the chamber.

13. The apparatus for extruding a flowable substrate of claim 1, wherein an interior profile of the extrusion chamber is substantially contoured to the horn face.

14. An apparatus for extruding a flowable substrate comprising:
an extrusion chamber including a top plate and a base forming a void for the flowable substrate to pass through, the top plate including a plurality of openings and the base having a plurality of extrusion orifices;
a plurality of ultrasonic resonant drivers corresponding to the plurality of extrusion orifices, wherein each ultrasonic resonant driver includes a horn face and wherein only the horn face extends into the extrusion chamber;
a mother horn coupled to the plurality of resonant drivers, the mother horn connected to the extrusion chamber through a nodal ring, wherein the nodal ring does not vibrate with a frequency of the mother horn;
a plurality of o-rings, each o-ring positioned between each of the openings and the horn faces sealing the void of the extrusion chamber; and
an infeed for supplying flowable substrate to the void of the extrusion chamber, wherein an extrusion path of the flowable substrate extends through the void of the extrusion chamber, across at least one of the horn faces, and out of at least one of the plurality of extrusion orifices, wherein the chamber remains inert during extrusion.

15. The apparatus for extruding a flowable substrate of claim 14, wherein each horn faces of the ultrasonic resonant drivers are located in a separate chamber having a corresponding infeed.

* * * * *